United States Patent
Lisewski

(10) Patent No.: US 11,202,177 B2
(45) Date of Patent: *Dec. 14, 2021

(54) SYSTEMS AND METHODS FOR CACHING AND MANAGING MULTICAST CONTENT

(71) Applicant: Verizon Patent and Licensing Inc., Basking Ridge, NJ (US)

(72) Inventor: Kevin Lisewski, Ramsey, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,843

(22) Filed: May 1, 2020

(65) Prior Publication Data

US 2020/0260234 A1    Aug. 13, 2020

Related U.S. Application Data

(63) Continuation of application No. 16/123,717, filed on Sep. 6, 2018, now Pat. No. 10,681,503.

(51) Int. Cl.
| | |
|---|---|
| *H04W 4/06* | (2009.01) |
| *H04W 12/06* | (2021.01) |
| *H04W 80/10* | (2009.01) |
| *H04L 29/08* | (2006.01) |
| *H04W 88/02* | (2009.01) |

(52) U.S. Cl.
CPC ............. *H04W 4/06* (2013.01); *H04L 67/141* (2013.01); *H04W 12/06* (2013.01); *H04W 80/10* (2013.01); *H04W 88/023* (2013.01)

(58) Field of Classification Search
CPC ..... H04W 4/06; H04W 88/023; H04W 12/06; H04W 80/10; H04L 67/141
See application file for complete search history.

(56) References Cited

U.S. PATENT DOCUMENTS

2013/0276017 A1* 10/2013 Walker ............... H04N 21/2407
725/25
2014/0372624 A1    12/2014 Wang et al.
(Continued)

OTHER PUBLICATIONS

U.S. Appl. No. 15/676,347, filed Aug. 14, 2017 titled Automated Content Delivery for Offline Consumption, inventors: Arvind Basra and Kevin Lisewski, 51 pages.

*Primary Examiner* — Pao Sinkantarakorn
*Assistant Examiner* — Kabir U Jahangir

(57) ABSTRACT

A user equipment (UE) device may include a memory storing instructions and processor configured to execute the instructions to register a service class for the UE device with multicast middleware installed on the UE device. The processor may be further configured to obtain a multicast session list associated with the service class from a Multimedia Broadcast Multicast Service (MBMS) device; identify a broadcast associated with the service class based on the obtained multicast session list; instruct the multicast middleware to tune into the identified broadcast during a time period associated with the identified broadcast; receive content associated with the identified broadcast using the multicast middleware; retrieve the content associated with the identified broadcast from the multicast middleware; and provide the retrieved content to an application installed on the UE device.

20 Claims, 10 Drawing Sheets

(56) References Cited

U.S. PATENT DOCUMENTS

| | | | |
|---|---|---|---|
| 2015/0201249 A1* | 7/2015 | Ryu | H04N 21/236 |
| | | | 725/62 |
| 2015/0222697 A1* | 8/2015 | Bassiouny | H04L 69/18 |
| | | | 709/203 |
| 2015/0270979 A1* | 9/2015 | Andrada | H04L 51/38 |
| | | | 370/390 |
| 2015/0281913 A1* | 10/2015 | Gholmieh | H04W 88/04 |
| | | | 370/312 |
| 2015/0365798 A1 | 12/2015 | Mcevilly et al. | |
| 2017/0264742 A1 | 9/2017 | Karimli et al. | |
| 2018/0063595 A1 | 3/2018 | Lo et al. | |
| 2018/0103364 A1* | 4/2018 | Gholmieh | H04W 40/246 |
| 2019/0394619 A1* | 12/2019 | Gholmieh | H04W 4/06 |

\* cited by examiner

902

```
{
 "id": "7890353554356",
 "DeviceId": "555-123-4567",
 "DeviceVehicleId": "AJR678",
 "State": "TX",
 "ServiceId": pro.network.net:VEH_DEVICES_TX: AJR678_1",
 "FileName":"batch_20180621_001102_web1002.zip",
 "IsFileAvailable": true,
 "timestamp":2018-06-21-11T09:58:02.312GMT",
 "success": tru
}
```

SYSTEMS AND METHODS FOR CACHING AND MANAGING MULTICAST CONTENT

CROSS REFERENCE TO RELATED APPLICATIONS

This patent application is a continuation of U.S. patent application Ser. No. 16/123,717, filed on Sep. 6, 2018, the contents of which are hereby incorporated by reference in their entirety.

BACKGROUND INFORMATION

In order to satisfy the needs and demands of users of mobile communication devices, providers of wireless communication services continue to improve and expand available services as well as networks used to deliver such services. One aspect of such improvements includes the development of wireless access networks as well as options to utilize such wireless access networks. A wireless access network may manage a large number of devices. For example, a base station may service a large number of wireless devices. At times, many of the wireless devices may need to communicate or receive information within a particular period of time, overwhelming the resources of the base station or the wireless access network.

DETAILED DESCRIPTION OF PREFERRED EMBODIMENTS

Figure 1:
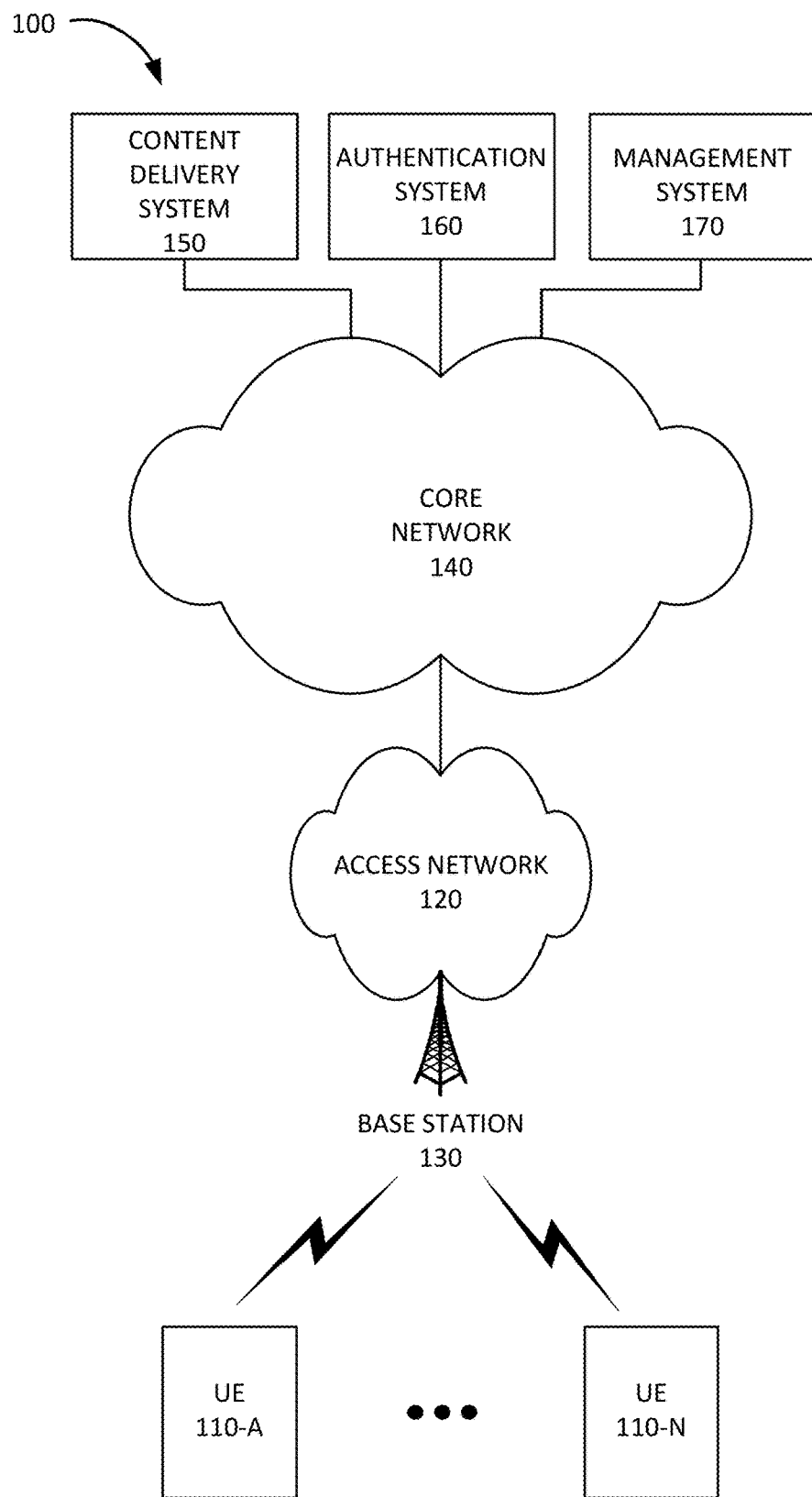
FIG. 1 is a diagram illustrating an environment according to an implementation described herein.

The following detailed description refers to the accompanying drawings. The same reference numbers in different drawings identify the same or similar elements.

In order to avoid having to establish a communication session with each user equipment (UE) device, a wireless access network may utilize a multicast/broadcast method to deliver content to a large number of UE devices. For example, when a large number of UE devices request the same content, and/or are scheduled to receive the same content, rather than sending the content individually from the content source to each UE device via a unicast connection, a content source device may send the content to the wireless access network, and the wireless access network may broadcast the content to the UE devices. Thus, in contrast to unicast method, which is a point-to-point method that may require that a communication session be individually established with each UE device, a multicast/broadcast method is a point-to-multipoint method that enables sending a message simultaneously to all devices in a multicast/broadcast group. Using a multicast delivery method may improve the efficiency of the wireless access network and result in the conserving of resources, such as bandwidth, processor load, and/or memory use.

A Fourth Generation (4G) Long Term Evolution (LTE) wireless access network may use a Multimedia Broadcast Multicast Service (MBMS) method, such as evolved MBMS (eMBMS) for Long Term Evolution (LTE) wireless access networks, to deliver multicast content. However, in order for a third-party application to be receive content via LTE multicast, a developer of the application may need deep technical background in order to configure the application for multicast services. For example, in order to configure an application to obtain multicast content, an application may need to acquire functionality to register a particular service class for multicast, start eMBMS services, obtain a Service Announcement (SA) file from eMBMS, implement a timer for requesting an updated SA file, parse an eMBMS session list, direct a UE device to tune into upcoming broadcasts, implement messaging and logic associated with multicast services, retrieve multicast content and store the multicast content in a particular location, and/or perform other types of functions associated with obtaining and/or managing multicast content. These technical barriers may make it difficult to make multicast content available to third parties.

Implementations described herein relate to systems and methods for obtaining, caching, and managing multicast content via a software development kit (SDK). The SDK may implement multicast functionality for an application without the application having to implement multicast functionality to directly interact with the multicast infrastructure of a wireless access network. The SDK may be provided to UE devices that are to receive multicast content and may be configured to interface with multicast middleware. The multicast middleware may be associated with a provider of communication services that manages the wireless access network and the multicast functionality provided by the wireless access network. The multicast middleware may interface with components of the UE device, such as a wireless modem, the operating system, and/or a Secure Digital (SD) card, to fetch a list of available multicast broadcasts and to select and obtain particular multicast broadcasts from the list.

Thus, a UE device in which the SDK is installed may be configured to determine a service class by obtaining a service class from an application on the UE device; register the service class with multicast middleware installed on the UE device; and obtain a multicast session list associated with the service class from an MBMS device. The service class may correspond to a particular Quality of Service (QoS) service class and/or to a service class assigned to a particular business customer. Thus, for example, a particular business may be assigned a particular service class to be used by UE devices associated with the business. Alternatively, a UE device may be programmed, configured, and/or associated with a specific service class during manufacture.

Obtaining the multicast session list associated with the service class may include instructing the multicast middleware to retrieve a list of all scheduled broadcasts and searching the list of all scheduled broadcasts to identify scheduled broadcasts associated with the service class. The UE device may further identify a broadcast associated with the service class based on the obtained multicast session list; instruct the multicast middleware to tune into the identified broadcast during a time period associated with the identified broadcast; receive content associated with the identified broadcast using the multicast middleware; retrieve the content associated with the identified broadcast from the multicast middleware; and provide the retrieved content to an application installed on the UE device.

The service class may be obtained via an application programming interface (API) provided to the application. Furthermore, the service class may be authenticated with respect to the application. For example, the UE device may send an authentication request to an authentication system to determine whether the application is authorized to register for the service class and may receive, from the authentication system, an indication that the application is authorized to register for the service class.

The UE device may be further configured to prepare the retrieved content for presentation by the application. Preparing the retrieved content may include extracting compressed files from the retrieved content, correlating thumbnail images in the retrieved content with video files in the retrieved content, parsing metadata associated with the retrieved content into a file format associated with the application, and/or other types of processing to prepare the content for presentation by the application. The API provided to the application may then be used to expose the prepared content to the application so the application is aware that the prepared content is ready for presentation.

Additionally, the UE device may be configured to send a report to a particular device associated with the application, which includes information indicating whether the content was successfully retrieved and provided to the application. Thus, the report, which may, for example, include a JavaScript Object Notation (JSON) file, may indicate success or failure with respect to a particular multicast broadcast and a particular UE device. Which particular device is to receive reports regarding multicast broadcasts associated with a particular application may be configured via the SDK.

FIG. 1 is a diagram of an exemplary environment 100 in which the systems and/or methods, described herein, may be implemented. As shown in FIG. 1, environment 100 may include user equipment (UE) devices 110-A to 110-N (referred to herein collectively as "UE devices 110" and individually as "UE device 110"), an access network 120, a core network 140, a content delivery system 150, an authentication system 160, and a management system 170.

UE device 110 may include any device with long-range (e.g., cellular or mobile wireless network) wireless communication functionality and user interface functionality to present content to a user. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a set-top box or a digital media player (e.g., Apple TV, Google Chromecast, Amazon Fire TV, etc.); a smart television; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), a type of M2M communication standardized by the 3rd Generation Partnership Project (3GPP), and/or another type of M2M communication. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Access network 120 may provide access to core network 140 for UE devices 110. Access network 120 may enable UE device 110 to connect to core network 140 for mobile telephone service, Short Message Service (SMS) message service, Multimedia Message Service (MMS) message service, Internet access, cloud computing, and/or other types of data services.

Access network 120 may establish or may be incorporated into a packet data network connection between UE device 110 and core network 140 via one or more Access Point Names (APNs). For example, access network 120 may establish an Internet Protocol (IP) connection between UE device 110 and core network 140. Furthermore, access network 120 may enable UE device 110 to communicate with an application server, and/or another type of device, located in core network 140 using a communication method that does not require the establishment of an IP connection between UE device 110 and core network 140, such as, for example, Data over Non-Access Stratum (DoNAS).

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a 5G access network or other advanced network that includes functionality such as carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include a base station 130. Base station 130 may service UE devices 110-A to 110-N. In other words, UE devices 110-A to 110-N may be located within the geographic area serviced by base station 130. Base station 130 may include a 4G base station (e.g., an eNodeB) and/or a 5G base station (e.g., a gNodeB). Base station 130 may include one or more cells that include devices and/or components configured to enable wireless communication with UE devices 110. For example, each cell may include a radio frequency (RF) transceiver facing a particular direction.

Core network 140 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. Some or all of core network 140 may be managed by a provider of communication services that also manages access network 120 and/or UE device 110. Core network 140 may allow the delivery of Internet Protocol (IP) services to UE device 110, and may interface with other external networks. Core network 140 may include one or more server devices and/or network devices, or other types of computation or communication devices. In some implementations, core network 140 may include an IP Multimedia Sub-system (IMS) network (not shown in FIG. 1). An IMS network may include a network for delivering IP multimedia services and may provide media flows between UE device 110 and external IP networks or external circuit-switched networks (not shown in FIG. 1).

Content delivery system 150 may include one or more devices, such as computer devices and/or server devices, which provide multicast content to UE devices 110. As an example, content delivery system 150 may provide video files for multicast distributions, such as movies, television shows, news broadcasts, sports broadcasts, advertisements, and/or other types of video files. As another example, content delivery system 150 may provide image files, such as images to be displayed by electronic billboards. As yet another example, content delivery system 150 may provide audio files, such as music files to be played by speakers. As yet another example, content delivery system 150 may provide other types of files, such as software update files for MTC devices, navigation files for vehicles, etc.

Authentication system 160 may include one or more devices, such as computer devices and/or server devices, which perform authentication for UE devices 110. For example, authentication system 160 may authenticate an application installed on UE device 110 to receive multicast content for a particular service class.

Management system 170 may include one or more devices, such as computer devices and/or server devices, which manage an application running on UE devices 110. For example, management system 170 may provide the application to UE devices 110 and may manage the application, by, for example, providing update to the application. Furthermore, management system 170 may receive reports from particular UE devices 110 relating to whether a particular multicast content was received successfully. Management system 170 may collect the reports, aggregate the reports, and generate a user interface that includes information relating to the reports, such as how many UE devices 110 failed to successfully receive a particular multicast content.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
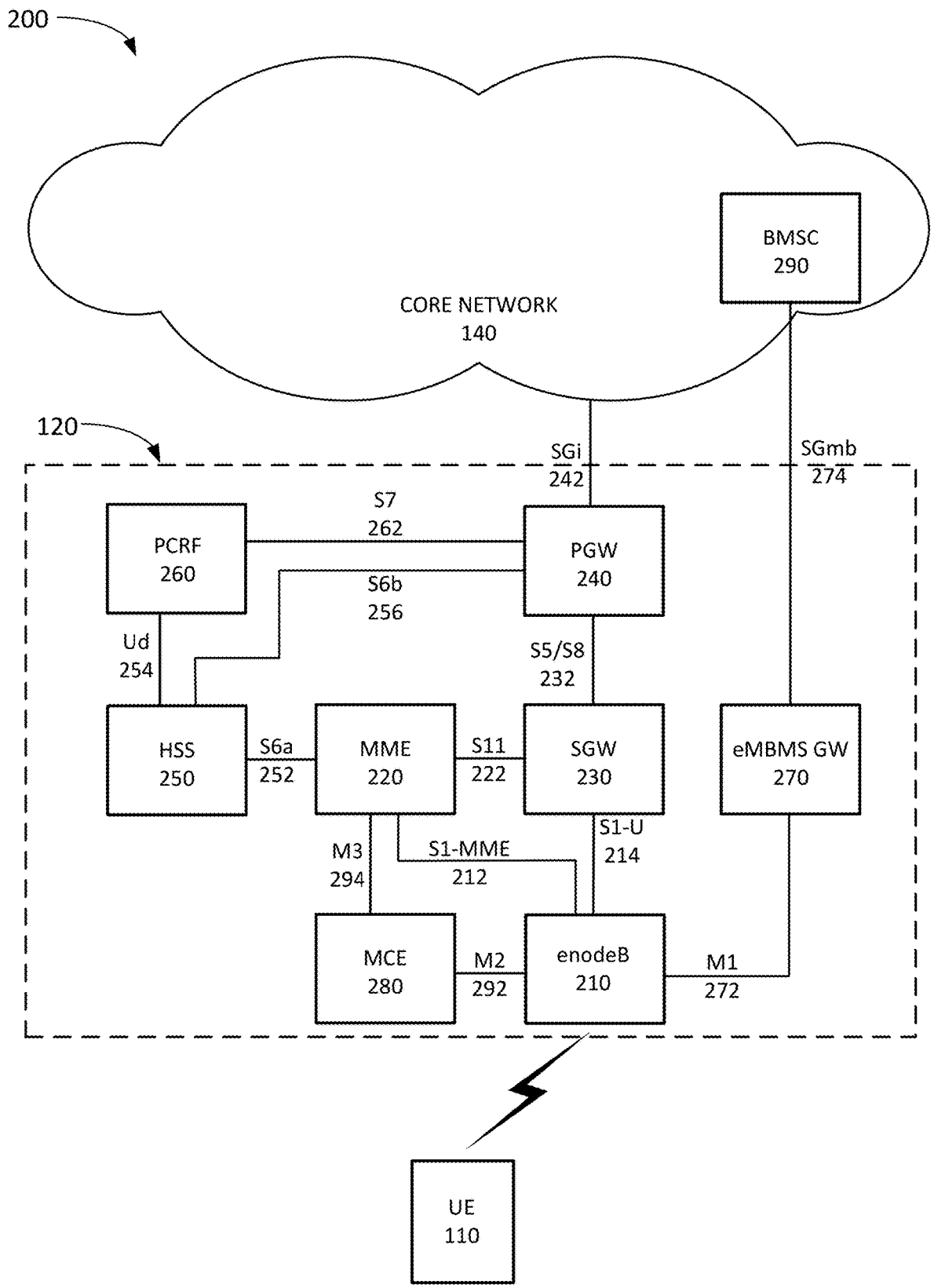
FIG. 2 is a diagram illustrating exemplary components of the access network of FIG. 1 according to an implementation described herein.

FIG. 2 is a diagram illustrating exemplary components of a system 200 that includes access network 120 and core network 140 according to an implementation described herein. Access network 120 may include an LTE access network that includes one or more devices that implement logical entities interconnected via standardized interfaces, and that provide wireless packet-switched services and wireless IP connectivity to UE devices for both data and voice services. Access network 120 may include eNodeB 210 (corresponding to base station 130), a mobility management entity (MME) 220, a serving gateway (SGW) 230, a packet data network gateway (PGW) 240, a home subscriber server (HSS) 250, a Policy and Charging Rules Function (PCRF) 260, an MBMS gateway (GW) 270, and a multicell/multicast coordination entity (MCE) 280, and core network 140 may include a broadcast/multicast service center (BMSC) 290. While FIG. 2 depicts a single eNodeB 210, MME 220, SGW 230, PGW 240, HSS 250, PCRF 260, eMBMS GW 270, MCE 280, and BMSC 290 for illustration purposes, in other implementations, FIG. 2 may include multiple eNodeBs 210, MMEs 220, SGWs 230, PGWs 240, HSS's 250, PCRFs 260, MBMS GWs 270, MCEs 280, and/or BMSCs 290.

eNodeB 210 may include one or more devices (e.g., base stations) and other components and functionality that allow UE device 110 to wirelessly connect to access network 120. eNodeB 210 may include or be associated with one or more cells. For example, each cell may include a radio frequency (RF) transceiver facing a particular direction. eNodeB 210 may interface with access network 120 via an interface referred to as an S1 interface, which may be split into a control plane S1-MME interface 212 and a data plane S1-U interface 214. S1-MME interface 212 may interface with MME 220. S1-MME interface 212 may be implemented, for example, with a protocol stack that includes a Network Access Server (NAS) protocol and/or Stream Control Transmission Protocol (SCTP). An S1-U interface 214 may interface with SGW 230 and may be implemented, for example, using GTPv2.

MME 220 may implement control plane processing for access network 120. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMES 220 in access network 120 and may send and receive information associated with UE devices 110, which may allow one MME 220 to take over control plane processing of UE devices serviced by another MME 220, if the other MME 220 becomes unavailable.

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface 232. S5/S8 interface 232 may be implemented, for example, using GTPv2.

PGW 240 may function as a gateway to core network 140 through an SGi interface 242. A particular UE device 110, while connected to a single SGW 230, may be connected to multiple PGWs 240, one for each packet network with which UE device 110 communicates.

MME 220 may communicate with SGW 230 through an S11 interface 222. S11 interface 222 may be implemented, for example, using GTPv2. S11 interface 222 may be used to create and manage a new session for a particular UE device 110. S11 interface 222 may be activated when MME 220 needs to communicate with SGW 230, such as when the particular UE device 110 attaches to access network 120, when bearers need to be added or modified for an existing session for the particular UE device 110, when a connection to a new PGW 240 needs to be created, or during a handover procedure (e.g., when the particular UE device 110 needs to switch to a different SGW 230).

HSS 250 may store information associated with UE devices 110 and/or information associated with users of UE devices 110. For example, HSS 250 may store subscription profiles that include authentication and access authorization information. Each subscription profile may include a list of UE devices 110 associated with the subscription as well as an indication of which UE device 110 is active (e. g., authorized to connect to access network 120).

MME 220 may communicate with HSS 250 through an S6a interface 252. S6a interface 252 may be implemented, for example, using a Diameter protocol. PGW device 240 may communicate with HSS device 250 through an S6b interface 256. S6b interface 256 may be implemented, for example, using a Diameter protocol.

PCRF 260 may implement policy charging and rule functions, such as establishing Quality of Service (QoS) requirements, bandwidth, and/or charges for a particular service for a UE device 110. PCRF 260 may communicate with PGW 240 through an S7 interface 262 and may communicate with HSS 250 through a Ud interface 254. S7 interface 262 may be based on a legacy Gx interface and may be implemented, for example, using Diameter protocol. Ud interface 254 may be used to exchange subscription data between PCRF 260 and HSS 250 and may be based on a provider specified protocol.

BMSC 290 may receive content intended for multicast/broadcast distribution from content delivery system 150 and may add application layer forward error correction (FEC) to add redundancy to the content. BMSC 290 may forward the content to eMBMS GW 270. Furthermore, BMSC 290 may support file repair and/or file retrieval via unicast if a particular UE device 110 does not receive a complete file during a multicast transmission.

eMBMS GW 270 may deliver a same file, such as multicast video, and/or other types of files, to a large number of UE devices 110 within a particular service area. In some implementations, content delivery system 150 may provide a file to BMSC 290, for example as an over-the-air (OTA) file. The OTA file may be sent as a one-time delivery or as a carousel delivery (e.g., repeated transmissions) to ensure all UE devices 110 receive the OTA file. Once a file delivery is complete, eMBMS may provide the functionality for UE device 110 to repair the received file via unicast if any symbols were lost during transmission. If repair cannot be performed, UE device 110 may fetch the entire file from the BMSC 290 via unicast.

eMBMS GW 270 may serve as a gateway between an IP network and the radio network serviced by eNodeB 210. If multiple eNodeBs 210 are involved in the distribution of content, eMBMS GW 270 may forward the multicast/broadcast content to all eNodeBs 210 participating in the content distribution. Furthermore, eMBMS GW 270 may route MBMS session control signaling to MMEs 220 that serve the eNodeBs 210 participating in the content distribution. eMBMS GW 270 may communicate with eNodeB 210 through an M1 interface 272. M1 interface 272 may be implemented, for example, using MBMS Synchronization Protocol (SYNC). In some implementations, eMBMS GW 270 may be implemented in PGW 240 or PGW 240 and eMBMS GW 270 may be implemented in the same device. In other implementations, eMBMS GW 270 may be implemented in a device separate and/or different from PGW 240.

MCE 280 may coordinate transmission between different cells of an eNodeB 210 and/or between multiple eNodeBs 210. MCE 280 may allocate and coordinate the resources used by multiple eNodeBs 210 participating in content distribution and may select a particular modulation and coding scheme for a particular multicast/broadcast transmission. Thus, radio scheduling and configuration roles performed by an eNodeB 210 during a unicast transmission may be centralized in MCE 280 during a multicast transmission (e.g., if multiple eNodeBs 210 are participating in the multicast transmission). MCE 280 may communicate with eNodeB 210 through an M2 interface 292 and MME 220 may communicate with MCE 330 through an M3 interface 294. M2 interface 292 and M3 interface 294 may be implemented, for example, using SCTP protocol.

In some implementations, MCE 280 may be implemented in eNodeB 210 or MCE 280 and eNodeB 210 may be implemented in the same device. In other implementations, MCE 280 may be implemented in MME 220 or MCE 280 and MME 220 may be implemented in the same device. In yet other implementation, eMBMS GW 270 may be implemented in a device that is separate and/or different from eNodeB 210 and MME 220.

Although FIG. 2 shows exemplary components of access network 120, in other implementations, access network 120 may include fewer components, different components, differently arranged components, or additional components than depicted in FIG. 2. Additionally or alternatively, one or more components of access network 120 may perform functions described as being performed by one or more other components of access network 120.

Figure 3:
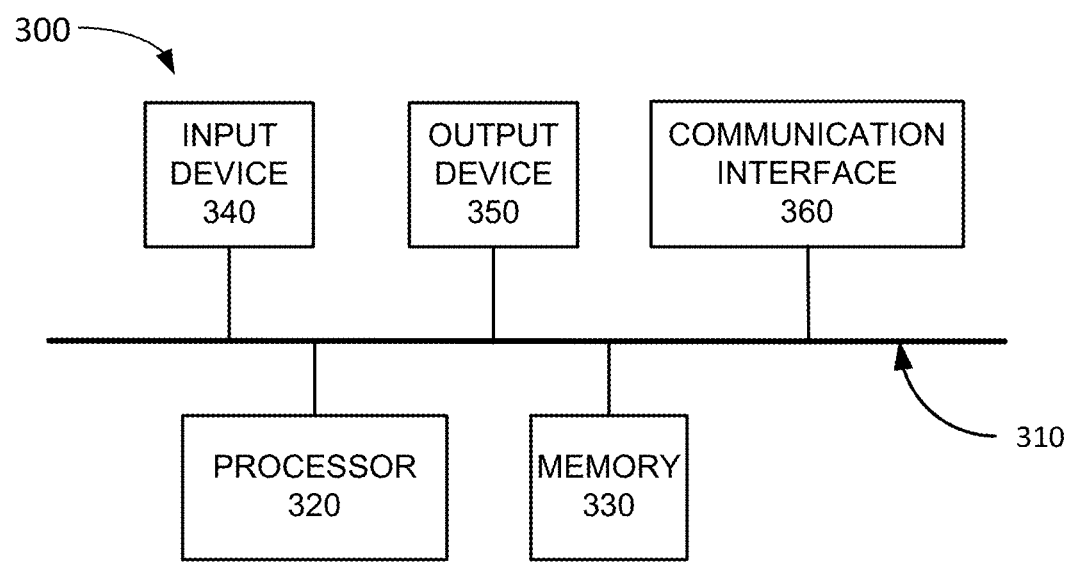
FIG. 3 is a diagram illustrating exemplary components of a device that may be included in a component of FIG. 1 or FIG. 2 according to an implementation described herein.

FIG. 3 is a diagram illustrating exemplary components of device 300 according to an implementation described herein. eNodeB 210, MME 220, SGW 230, PGW 240, HSS 250, PCRF 260, eMBMS GW 270, MCE 280, BMSC 290, content delivery system 150, authentication system 160, and/or management system 170 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to generating managing and caching multicast content. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
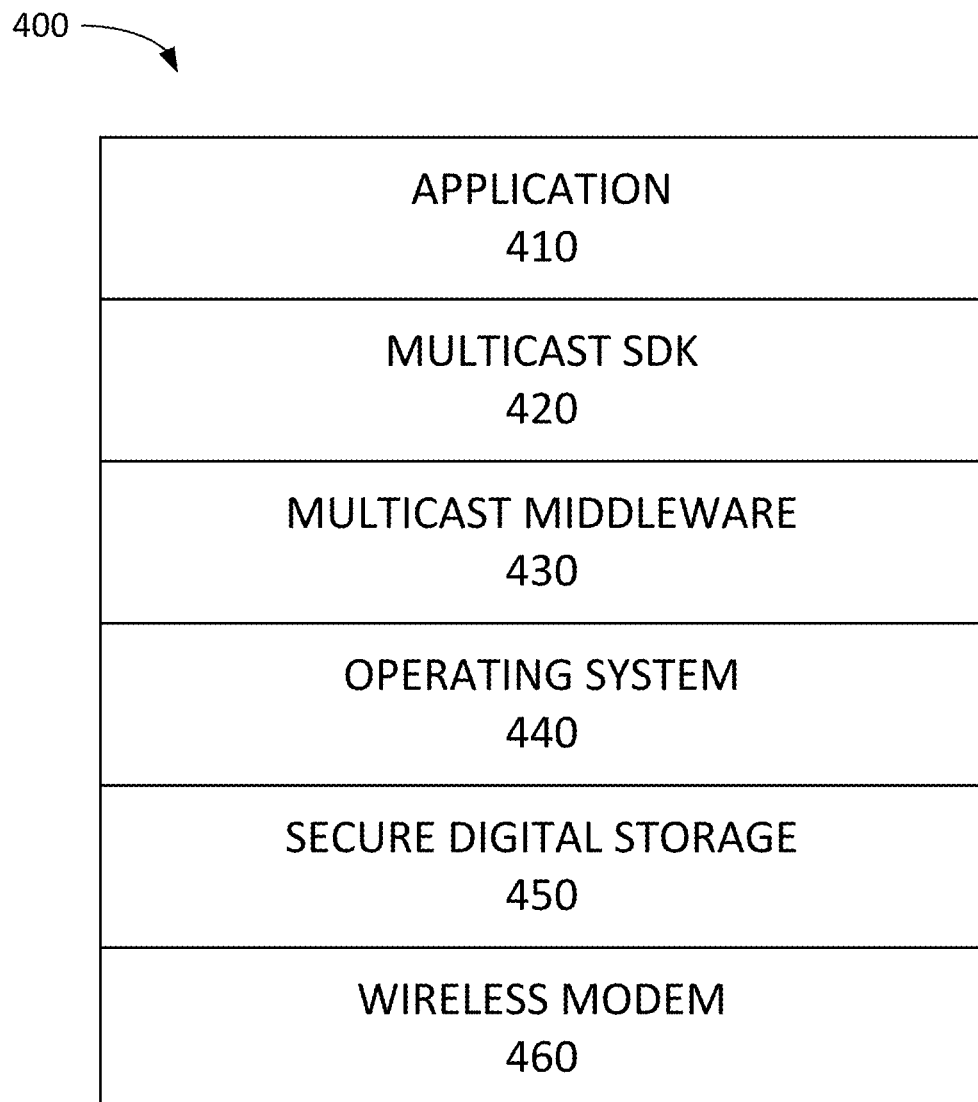
FIG. 4 is a diagram illustrating an exemplary hierarchical stack of functional components in a user equipment device according to an implementation described herein.

FIG. 4 is a diagram illustrating an exemplary hierarchical stack 400 of functional components in a user equipment device according to an implementation described herein. The functional components of stack 400 may be implemented, for example, in UE device 1110 via processor 320 executing instructions from memory 330. Alternatively, some or all of the functional components of stack 400 may be implemented via hard-wired circuitry. As shown in FIG. 4, stack 400 may include an application 410, a multicast SDK 420, a multicast middleware 430, an operating system 440, a secure digital storage 450, and a wireless modem 460.

Application 410 may include an application that utilizes multicast content. As an example, application 410 may include a media player that plays multicast video, displays images, plays audio files, etc. As another example, application 410 may manage operation of an MTC device, such as, for example, a parking meter, a utility meter, a security monitoring device, etc. Application 410 may interact with multicast SDK 420 via an API provided to application 410 by multicast SDK 420.

Multicast SDK 420 may interface with application 410 and obtain multicast content for application 410. Multicast SDK 420 may register application 410 for a particular service class, may direct multicast middleware 430 to obtain an SA file from eMBMS GW 270, may select scheduled broadcasts associated with the particular service class from the list of scheduled broadcasts in the obtained SA file, and may instruct multicast middleware 430 to tune in to the selected scheduled broadcasts. Furthermore, multicast SDK 420 may retrieve multicast content obtained by multicast middleware 430, prepare the content for presentation, and expose the presented content to application 410 via the API. Moreover, multicast SDK 410 may send a report to management system 170 relating to a selected scheduled broadcast.

Multicast middleware 430 may perform various functions relating to obtaining multicast content from eMBMS GW 270 to UE device 110. For example, multicast middleware 430 may obtain an SA file that lists scheduled broadcasts and may tune it to a particular scheduled broadcast to store the scheduled broadcast on UE device 110. Multicast middleware 430 may further perform functions relating to reliable content delivery, such as transport layer management, session management, loss detection, re-transmissions, etc.

Operating system 440 may include the operating system of UE device 110. Secure digital storage 450 may manage the operation of an SD card and/or other types of secure storage on UE device 110. Multicast SDK 420 may store obtained multicast content in secure digital storage 450 and may enable application 410 to access the multicast content stored in secure digital storage 450.

Wireless modem 460 may manage the wireless communication of UE device 110. For example wireless modem 460 may include communication interface 360. Wireless modem 460 may be directed by multicast middleware 430 to authenticate with authentication system 160, obtain multicast content from MBMS GW 270, etc. Furthermore, wireless modem 460 may be directed by multicast SDK 420 to send a report to management system 170.

Although FIG. 4 shows exemplary functional components of stack 400, in other implementations, stack 400 may include fewer functional components, different functional components, differently arranged functional components, or additional functional components than depicted in FIG. 4. Additionally, or alternatively, one or more functional components of stack 400 may perform functions described as being performed by one or more other functional components of stack 400.

Figure 5:
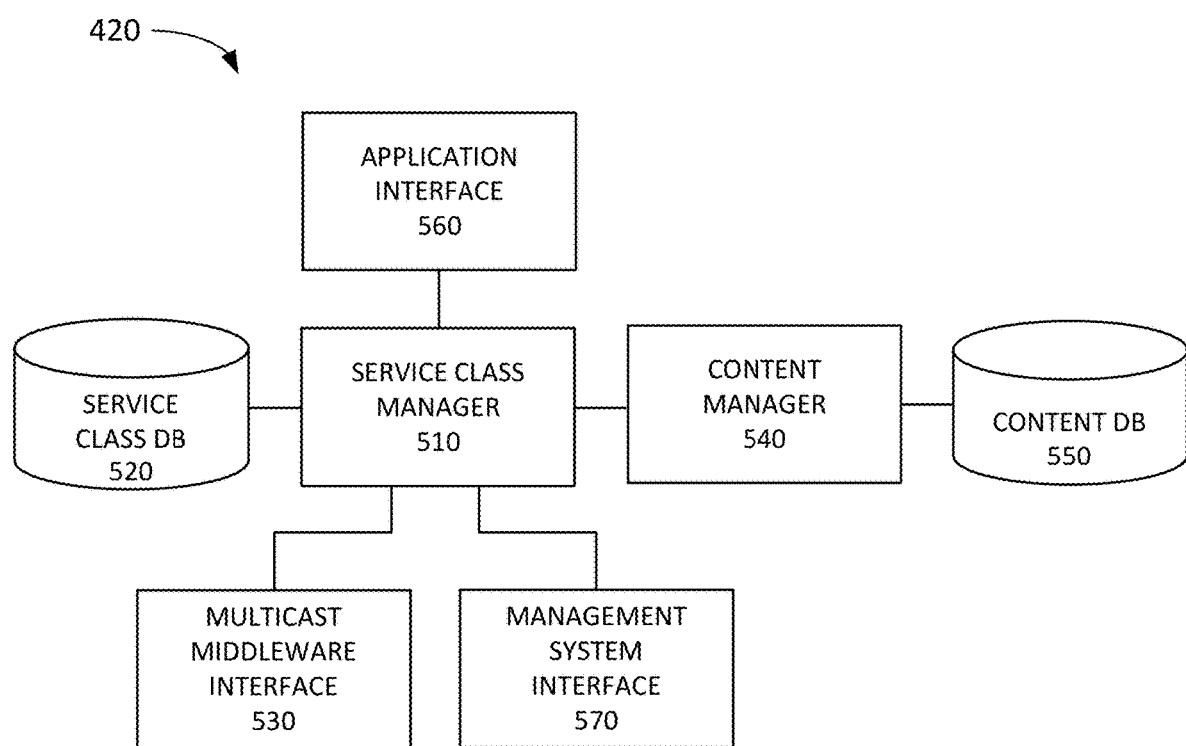
FIG. 5 is a diagram illustrating exemplary functional components of the multicast software development kit of FIG. 4.

FIG. 5 is a diagram illustrating exemplary functional components of multicast SDK 420. The functional components of multicast SDK 420 may be implemented, for example, via processor 320 executing instructions from memory 330. Alternatively, some or all of the functional components of multicast SDK 420 may be implemented via hard-wired circuitry. As shown in FIG. 5, multicast SDK 420 may include a service class manager 510, a service class database (DB) 520, a multicast middleware interface 530, a content manager 540, a content DB 550, an application interface 560, and a management system interface 570.

Service class manager 510 may manage a particular service class associated with application 410. For example, service class manager 510 may receive a request from application 410 to register a particular service class and may authenticate the particular multicast service class for application 410 with authentication system 160. After authentication, service class manager 510 may register application 410 for the particular multicast service class by storing an indication in service class DB 520 that application 410 is associated with the particular multicast service class.

Service class DB 520 may store information relating to particular multicast service classes. For example, for each service class, service class DB 520 may store information identifying application 410 associated with a particular multicast service class (e.g., a service class identifier), information identifying whether application 410 has been authenticated for the particular multicast service class, information identifying management system 170 which reports relating to multicast content obtained for application 410 should be sent (e.g., a Uniform Resource Identifier (URI) associated with management system 170, etc.), information identifying retrieved content associated with the particular multicast service class, information identifying retrieved content associated with the particular multicast service class that has been prepared and is ready for presentation by application 410, a sequence of processing steps to prepare multicast content for use by application 410, and/or other types of information associated with the particular multicast service class.

Service class manager 510 may interact with multicast middleware interface 530 to obtain multicast content for a particular service class for which application 410 has been registered. Multicast middleware interface 530 may interface with multicast middleware 430. For example, multicast middleware interface 530 may instruct multicast middleware 430 to obtain an SA file, to tune in and receive a particular scheduled broadcast, and/or to inform multicast SDK 420 that the particular scheduled broadcast has been received and stored in secure digital storage 450.

Content manager 540 may manage multicast content obtained and stored in secure digital storage 450. For example, content manager 540 may retrieve multicast content obtained by multicast middleware 430 and stored in secure digital storage 450. Content manager 540 may prepare the retrieved content for presentation by, for example, extracting compressed files, correlating thumbnails with video files, parsing metadata into a particular file format associated with application 410, and/or other types of processing to prepare the retrieved content for use by application 410. Content manager 540 may determine a sequence of processing steps to perform based on information stored in service class DB 520. Content manager 540 may store the prepared content in content DB 550 (e.g., in secure digital storage 450) and may inform application 410 that the prepared content is ready for use via application interface 560.

Application interface 560 may interface with application 410. For example, application interface 560 may implement an API that enables application 410 to register for a multicast service class, to access multicast content that has been received and prepared for use, and/or to process other requests from application 410 relating to multicast content.

Management system interface 570 may interface with management system 170. For example, management system interface 570 may send reports to management system 170. In some implementations, the reports may be sent via an IP connection established by PGW 240. In other implementations, the reports may be sent via a DoNAS technique facilitated by MME 220.

MBMS interface 550 may communicate with UE device 110 to send an MBMS message to UE device 110. For example, MBMS interface 550 may generate a multicast/broadcast group, may add UE devices 110 to the multicast/broadcast group, and may multicast or broadcast a message to UE devices 110 in the multicast/broadcast group, such that the UE devices 110 receive the message at substantially the same time. Unicast interface 560 may communicate with UE devices 110 to send a unicast message to UE devices 110. For example, unicast interface 560 may establish a communication message with a particular UE device 110 and may send a unicast message to the particular UE device 110.

Although FIG. 5 shows exemplary functional components of multicast SDK 420, in other implementations, multicast SDK 420 may include fewer functional components, different functional components, differently arranged functional components, or additional functional components than depicted in FIG. 5. Additionally, or alternatively, one or more functional components of multicast SDK 420 may perform functions described as being performed by one or more other functional components of multicast SDK 420.

Figure 6:
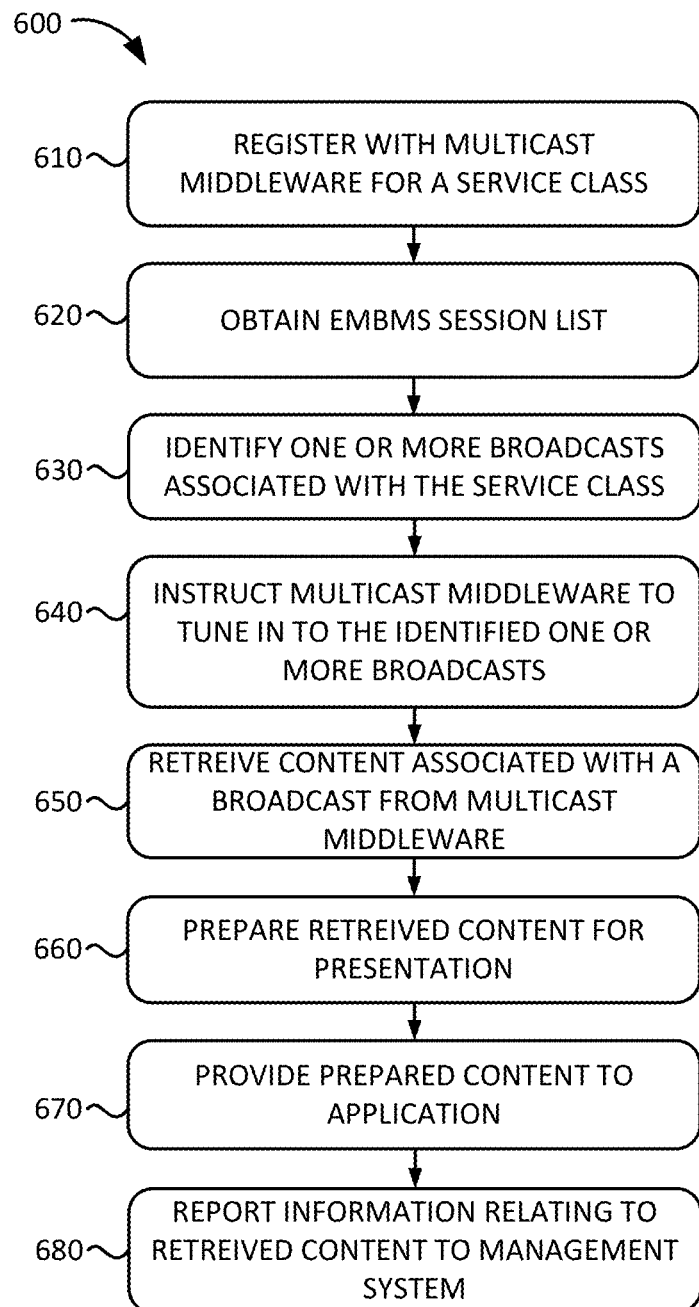
FIG. 6 is a flowchart of a process for caching and managing multicast content according to an implementation described herein.

FIG. 6 is a flowchart of a process for caching and managing multicast content according to an implementation described herein. In some implementations, the process of FIG. 6 may be performed by UE device 110. In other implementations, some or all of the process of FIG. 6 may be performed by another device or a group of devices separate from UE device 110.

The process of FIG. 6 may include registering with multicast middleware for a service class (block 610). For example, service class manager 510 may receive a request from application 410 to register a particular service class, authenticate the particular multicast service class for application 410 with authentication system 160, and register application 410 for the particular multicast service class by storing an indication, in service class DB 520, that application 410 is associated with the particular multicast service class.

An eMBMS session list may be obtained (block 620) and one or more broadcasts associated with the service class may be identified (block 630). For example, multicast middleware interface 530 may instruct multicast middleware 430 to obtain an SA file and service class manager 510 may search the obtained SA file to identify all scheduled broadcasts that have been tagged with an identifier associated with the service class.

Multicast middleware may be instructed to tune in to the identified one or more broadcasts (block 640) and content associated with a broadcast may be retrieved from the multicast middleware (block 650). For example, multicast middleware interface 530 may instruct multicast middleware 430 to tune in at the scheduled time for an identified broadcast to receive the identified broadcast, and to store the content being broadcast in a temporary storage location associated with multicast middleware 430. Content manager 540 may then copy the stored content to secure digital storage 450.

The retrieved content may be prepared for presentation (block 660) and the prepared content may be provided to the application (block 670). For example, content manager 540 may determine a sequence of processing steps for the stored content based on information stored in service class DB 520 and my carry out the processing steps, such as extracting compressed files, correlating thumbnails with video files, parsing metadata into a particular file format associated with application 410, and/or other types of processing to prepare the retrieved content for use by application 410. Content manager 540 may then send a message to application 410, via an API, informing application 410 that the prepared content is ready for use.

Information relating to the retrieved content may be reported to management system 170 (block 680). For example, management system interface 570 may send a report to management system 170 based on an address, provided to multicast SDK 420 by application 410 or by management system 170 and stored in service class DB 520. The report may include information identifying UE device 110 and/or application 410, the multicast content, the time at which the multicast content was broadcast, and whether the multicast content was successfully received, prepared, and provided to application 410. The report may include, for example, a JSON file and/or a file in another format (e.g., an Extensible Markup Language (XML) file, etc.).

Figure 7A:
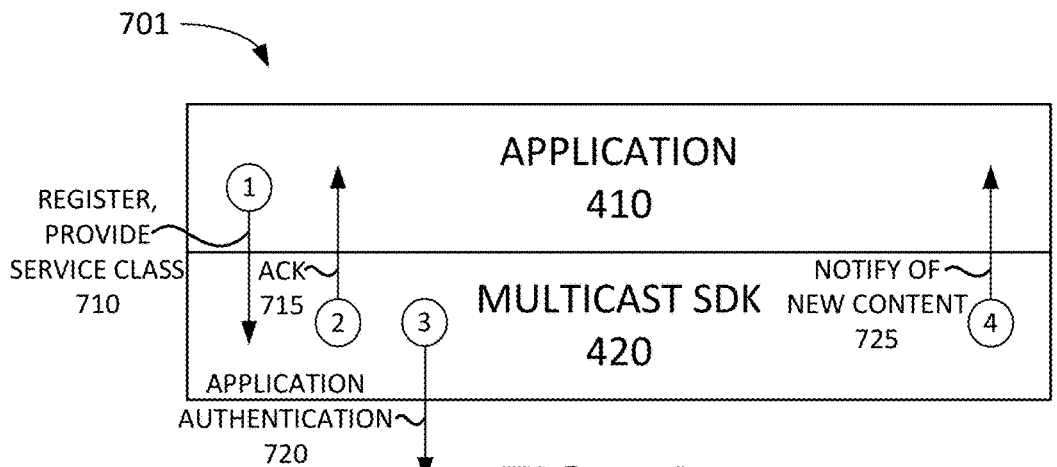
FIGS. 7A and 7B are diagrams illustrating exemplary message flows in the hierarchical stack of functional components of FIG. 4 according to an implementation described herein.

FIG. 7A illustrates a first exemplary message flow 701 in stack 400. As shown in FIG. 7A, message flow 701 may include application 410 sending a request to multicast SDK 420 to register a multicast service class via an API made available to application 410 by multicast SDK 420 (message 710). Multicast SDK 420 may acknowledge (ACK) the received request (message 715) and may authenticate application 410 for the requested multicast service class with authentication system 260 (message 720). After the authentication, multicast SDK 420 may start to receive multicast content for the registered service class for application 410 and may notify, via the API, application 410 of new multicast content that has becomes available (message 725).

Figure 7B:
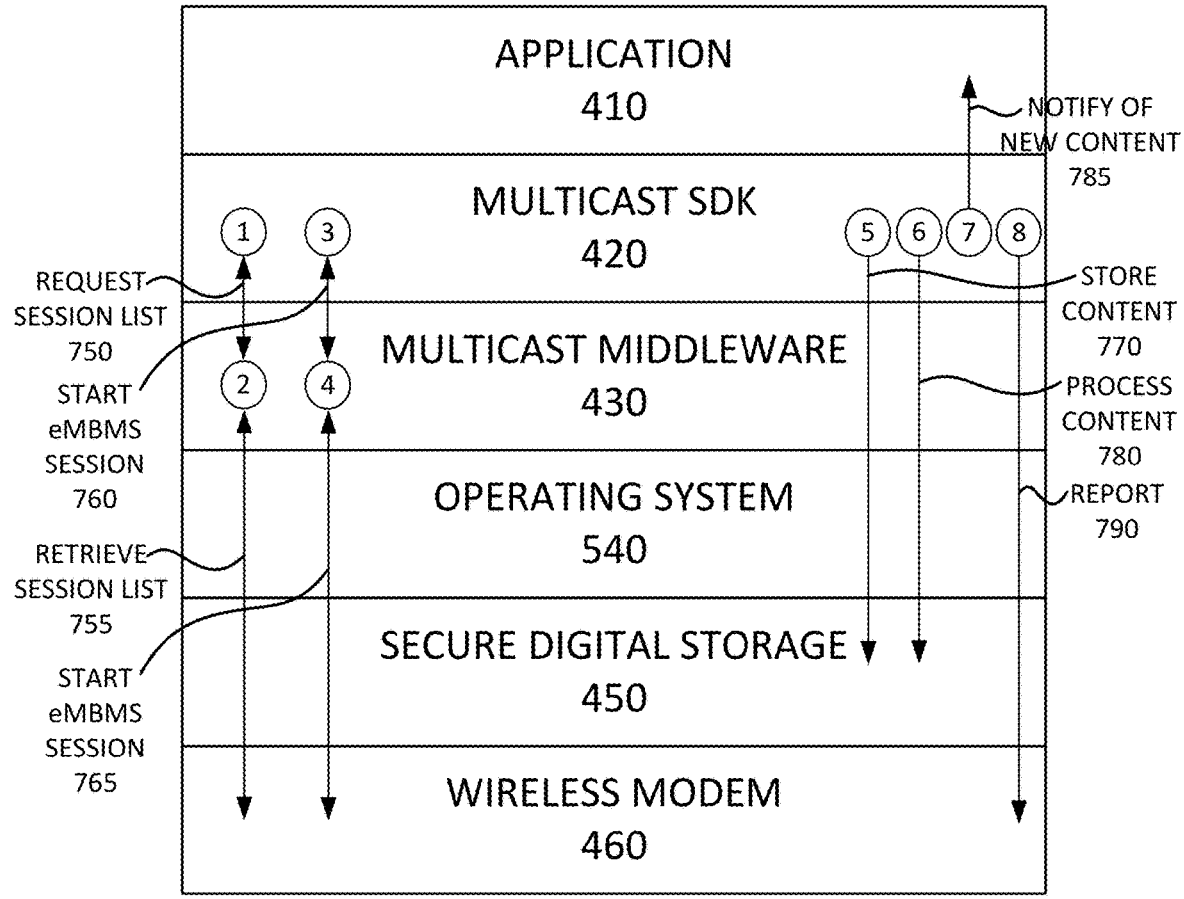

FIG. 7B illustrates a second exemplary message flow 702 in stack 400 for obtaining multicast content for the registered service class. As shown in FIG. 7B, message flow 702 may include multicast SDK 420 requesting a session list from multicast middleware 430 (message 750) and multicast middleware obtaining the SA file from eMBMS GW 270 (message 755). Multicast SDK 420 may then search the SA file to identify scheduled broadcasts for the registered service class and my start an eMBMS session, via multicast middleware 430, at the scheduled time for each broadcast of content associated with the registered service class (messages 760 and 765).

Multicast middleware 430 may store the multicast content obtained from eMBMS GW 270 in temporary storage and multicast SDK 420 may copy the multicast content from the temporary storage in permanent storage in secure digital storage 450 (message 770). Multicast SDK 420 may then prepare the stored content for use by application 410 by unpacking compressed files, correlating video or audio files with associated thumbnail images, parsing metadata into a database file in a format associated with application 410, etc. (message 780). Multicast SDK 420 may then notify, via the API, application 410 of the prepared multicast content (message flow 785) and may send a report to management system 170 indicating that the multicast content was successfully received by UE device 110 (message 790).

Figure 8:
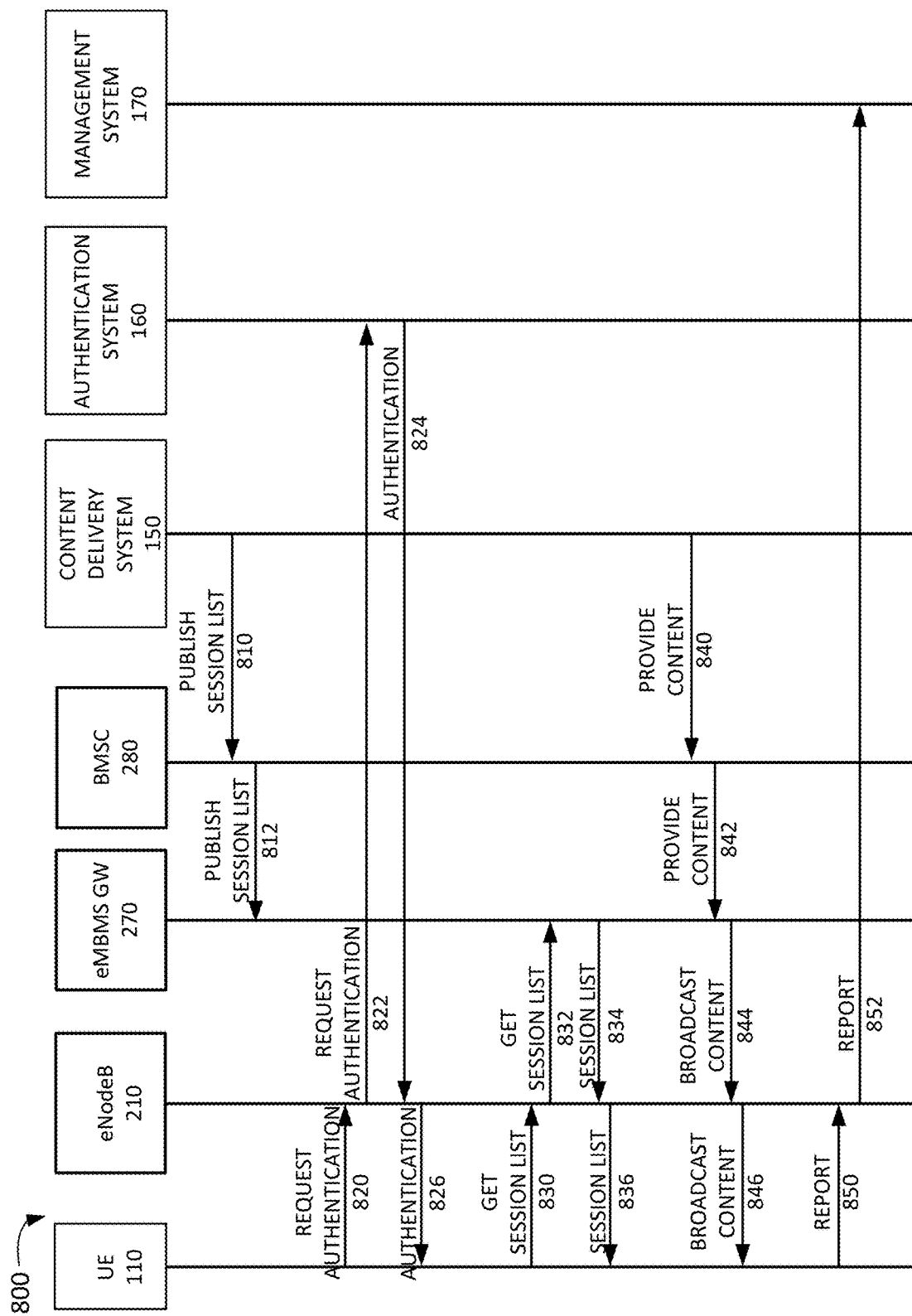
FIG. 8 is a diagram of an exemplary signal flow according to an implementation described herein.

FIG. 8 is a diagram of an exemplary signal flow 800 according to an implementation described herein. As shown in FIG. 8, signal flow 800 may include content delivery system 150 publishing a session list of scheduled broadcasts to BMSC 280 (signal 810) and BMSC 280 forwarding the session list to eMBMS GW 270 (signal 812).

At a later time, application 410 on UE device 110 may register for a multiclass service class associated with content delivery system 150 and multicast SDK 420 in UE device 110 may request authentication of the multicast service class with authentication system 160 (signals 820 and 822). Authentication system 160 may confirm the authentication (signals 824 and 826). After the authentication, UE device 110 may be registered for the multicast service class. Multicast SDK 420 on UE device 110 may request a session list of scheduled broadcasts from eMBMS GW 270 via eNodeB 210 (signals 830 and 832). eMBMS GW 270 may provide the session list to multicast middleware 430 in UE device 110 (signals 834 and 836).

Multicast SDK 420 may identify a scheduled broadcast in the obtained session list that is associated with the registered service class and may instruct multicast middleware 430 to tune into the broadcast to obtain the broadcast content. At the scheduled time, content delivery system 150 may send the content associated with the scheduled broadcast to BMSC 280 (signal 840) and BMSC 280 may provide the content to eMBMS GW 270 (signal 842). eMBMS GW 270 may broadcast the content via eNodeB 210 (signals 844 and 846). Thus, UE device 110 may receive the broadcast content and multicast SDK 420 in UE device 110 may store and process the content and notify application 410 that the content is ready for use. Multicast SDK 420 in UE device 110 may then send a report to management system 170 via eNodeB 210 indicating that the multicast content was successfully received by UE device 110 (signals 850 and 852)

Figure 9A:
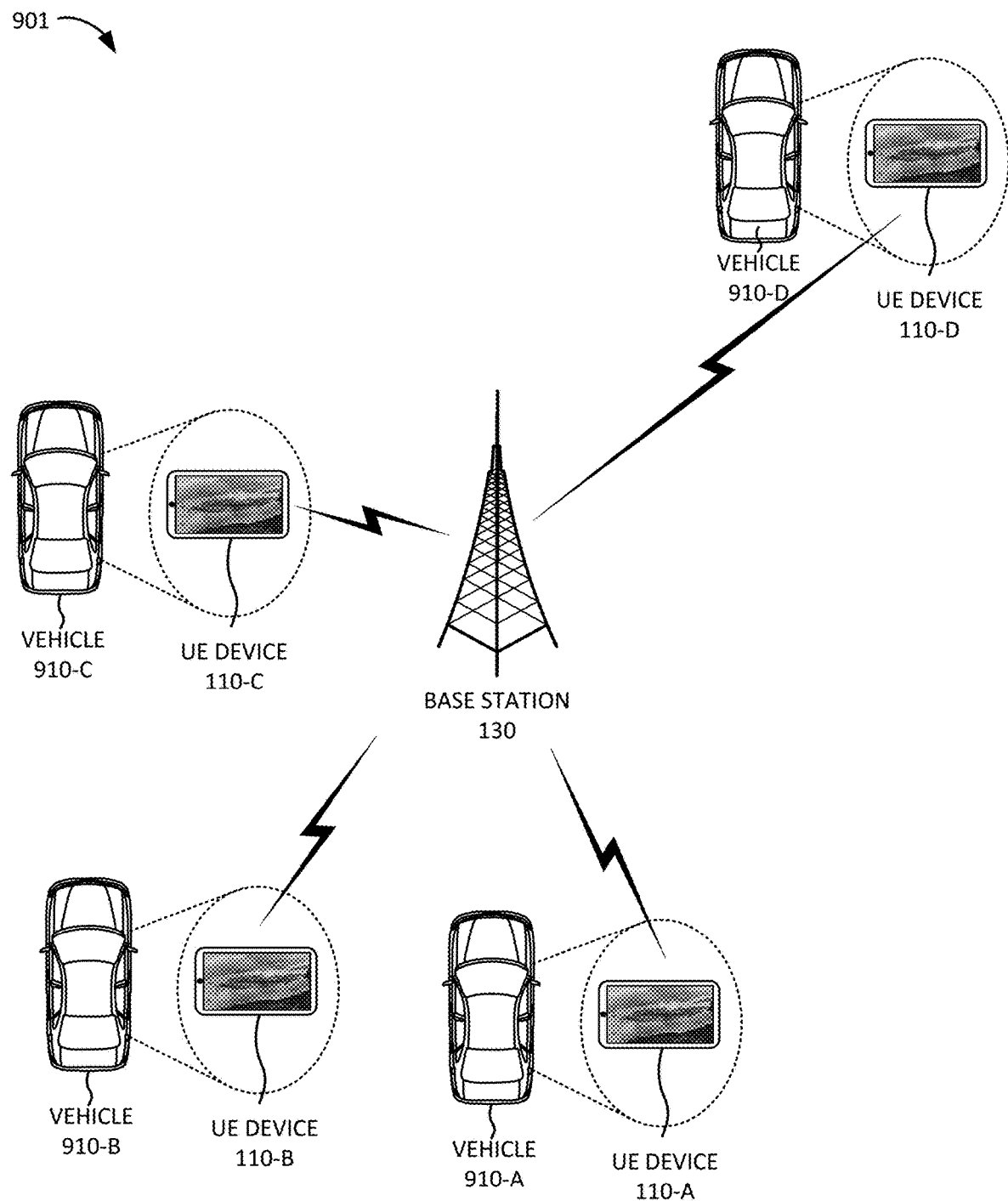
FIG. 9A is a diagram of an exemplary system according to an implementation described herein.

FIG. 9A is a diagram of an exemplary system 901 according to an implementation described herein. System 901 illustrates an implementation in which a taxi or ridesharing business provides video content, and/or navigation content, to UE devices 110 included in vehicles. For example, UE device 110 may be mounted in a vehicle so that a passenger may be able to view video content while riding in the vehicle.

As shown in FIG. 9A, system 901 may include base station 130 and vehicles 910-A, 910-B, 910-C, and 910-D within the service area of base station 130. Vehicle 910-A may include UE device 110-A, vehicle 910-B may include UE device 110-B, vehicle 910-C may include UE device 110-C, and vehicle 910-D may include UE device 110-D. UE devices 110-A, 110-B, 110-C, and 110-D may be attached to base station 130 and may receive multicast content, associated with a service class assigned to the taxi or ride-sharing business, when the multicast content is broadcast by base station 130.

Figures 9B, 9C:
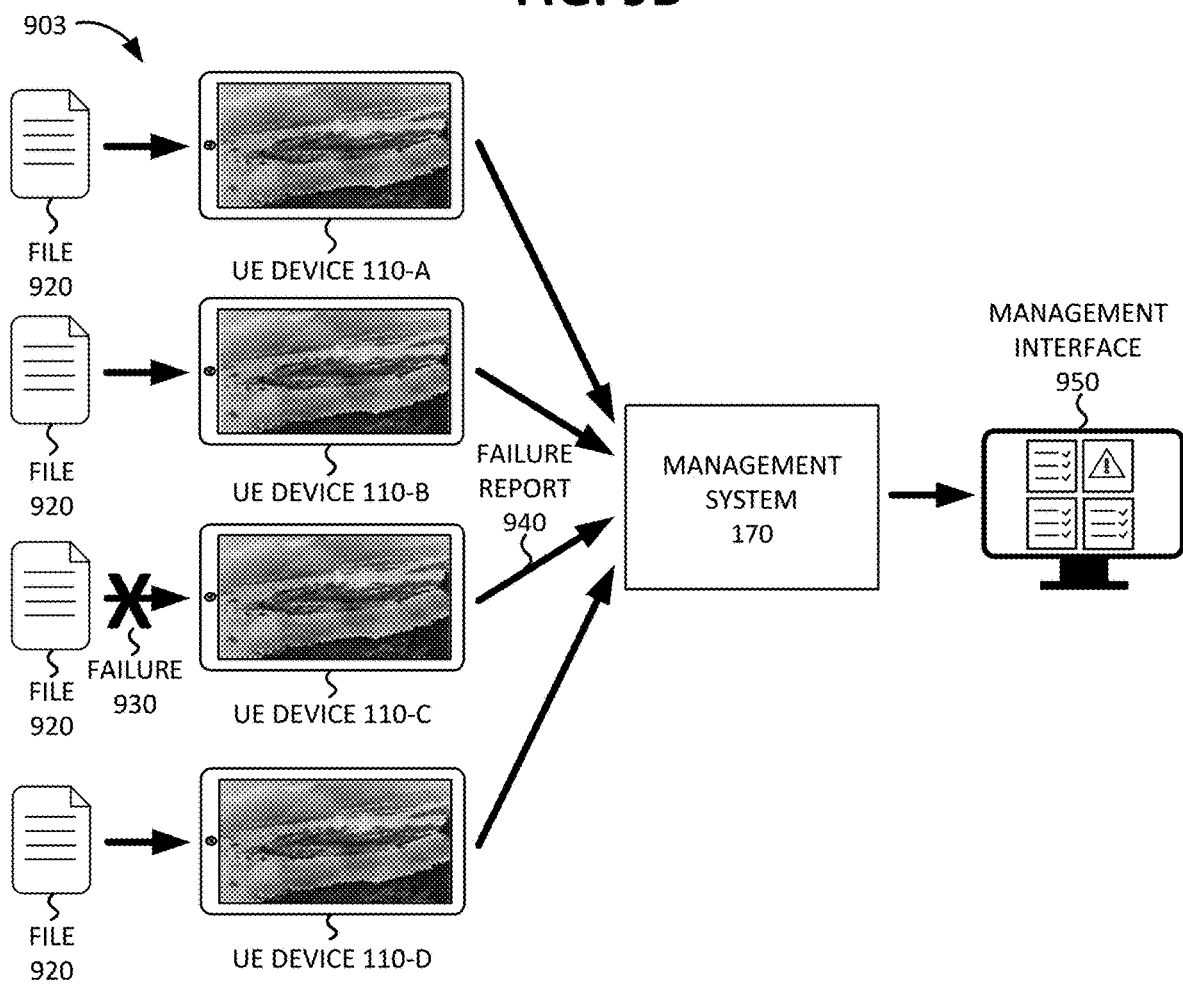
FIG. 9B is a diagram illustrating an exemplary report according to an implementation described herein.
FIG. 9C is a diagram illustrating an exemplary processing of a report generated in the system of FIG. 9A according to an implementation described herein.

FIG. 9B is a diagram illustrating an exemplary report 902 generated by UE device 110 associated with system 901. As shown in FIG. 9B, report 902 may include a JSON file that includes information identifying the success or failure of a particular vehicle 910 receiving a particular broadcast at a particular time.

FIG. 9C is a diagram illustrating an exemplary processing 903 of report 902. As shown in FIG. 9C, processing 903 may include file 920 being broadcast by base station 130 to UE devices 110-A, 110-B, 110-C, and 110-D. Assume that file 920 was successfully delivered to UE devices 110-A, 110-B, and 110-C and that there was a delivery failure to UE device 110-C. UE devices 110-A, 110-B, and 110-D may each report a success to management system 170 and UE device 110-C may send a failure report 940 to management system 170. Management system 170 may then display, via a management interface 950 for an administrator, the received reports. Thus, the administrator may take action with respect to UE device 110-C, such as analyzing why the delivery of file 920 failed and/or providing file 920 to UE device 110-C through a unicast delivery.

While FIGS. 9A-9C describe an exemplary application of the systems and methods described herein for illustrative purposes, the systems and methods described herein may be used for other types of applications. As an example, a school or university may distribute text and/or images through multicast to be displayed by electronic signs or billboards throughout a campus. As another example, a business with multiple locations may distribute music and/or audio announcements through multicast to smart speakers installed in lobbies of the business locations. As yet another example, a municipality may distribute a software update through multicast to smart parking meters located on the streets of the municipality. As yet another example, a delivery service may distribute a navigation file through multicast to a fleet of aerial delivery drones.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, and a series of signal flows has been described with respect to FIGS. 7A, 7B, and 8, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Collection, storage, and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a user equipment (UE) device, the method comprising:
providing an application programming interface (API) to an application installed on the UE device to register a service class with a multicast service class manager that interfaces with a multicast middleware;

instructing the multicast middleware to obtain a multicast session list from a Multimedia Broadcast Multicast Service (MBMS) device;

instructing the multicast middleware to tune in to a broadcast, associated with the service class and listed in the obtained multicast session list, during a time period associated with the broadcast;

receiving content associated with the broadcast using the multicast middleware; and providing the received content to an application installed on the UE device.

2. The method of claim 1, further comprising:
associating the service class with the application in a service class database maintained by the multicast service class manager.

3. The method of claim 2, wherein obtaining the multicast session from the MBMS device includes:
instructing the multicast middleware to retrieve a list of all scheduled broadcasts; and
searching the list of all scheduled broadcasts to identify scheduled broadcasts associated with the service class.

4. The method of claim 1, further comprising:
preparing the received content for presentation by the application.

5. The method of claim 4, wherein preparing the received content for presentation includes at least one of:
extracting a compressed file from the received content;
correlating a thumbnail image in the received content with a video file in the received content; or
parsing metadata associated with the received content into a file format associated with the application.

6. The method of claim 5, wherein providing the received content to an application installed on the UE device includes:
exposing the prepared content via another application programming interface (API) provided to the application by the multicast service class manager.

7. The method of claim 1, further comprising:
sending a report to a server device associated with the application, wherein the report includes information indicating whether the content was successfully received and provided to the application.

8. The method of claim 7, wherein the report includes a JavaScript Object Notation (JSON) file.

9. The method of claim 2, further comprising:
sending an authentication request to an authentication system to determine whether the application is authorized to register for the service class; and
receiving, from the authentication system, an indication that the application is authorized to register for the service class.

10. A user equipment (UE) device comprising:
a memory storing instructions; and
a processor configured to execute the instructions to:
provide an application programming interface (API) to an application installed on the UE device to register a service class with a multicast service class manager that interfaces with a multicast middleware;
instruct the multicast middleware to obtain a multicast session list from a Multimedia Broadcast Multicast Service (MBMS) device;
instruct the multicast middleware to tune in to a broadcast, associated with the service class and listed in the obtained multicast session list, during a time period associated with the broadcast;
receive content associated with the broadcast using the multicast middleware; and provide the received content to an application installed on the UE device.

11. The UE device of claim 10, wherein the processor is further configured to:
associate the service class application in a service class database maintained by the multicast service class manager.

12. The UE device of claim 11, wherein, when obtaining the multicast session list from the MBMS device, the processor is further configured to:
instruct the multicast middleware to retrieve a list of all scheduled broadcasts; and
search the list of all scheduled broadcasts to identify scheduled broadcasts associated with the service class.

13. The UE device of claim 10, wherein the processor is further configured to:
prepare the received content for presentation by the application.

14. The UE device of claim 13, wherein, when preparing the received content for presentation, the processor is configured to at least one of:
extract a compressed file from the received content;
correlate a thumbnail image in the received content with a video file in the received content; or
parse metadata associated with the received content into a file format associated with the application.

15. The UE device of claim 14, wherein, when providing the received content to an application installed on the UE device, the processor is further configured to:
expose the prepared content via another application programming interface (API) provided to the application by the multicast service class manager.

16. The UE device of claim 10, wherein the processor is further configured to:
send a report to a server device associated with the application, wherein the report includes information indicating whether the content was successfully received and provided to the application.

17. The UE device of claim 16, wherein the report includes a JavaScript Object Notation (JSON) file.

18. The UE device of claim 11, wherein the processor is further configured to:
send an authentication request to an authentication system to determine whether the application is authorized to register for the service class; and
receive, from the authentication system, an indication that the application is authorized to register for the service class.

19. A non-transitory computer-readable memory device storing instructions executable by one or more processors, the non-transitory computer-readable memory device comprising:
one or more instructions to provide an application programming interface (API) to an application installed on the UE device to register a service class with a multicast service class manager that interfaces with a multicast middleware;
one or more instructions to instruct the multicast middleware to obtain a multicast session list from a Multimedia Broadcast Multicast Service (MBMS) device;
one or more instructions to instruct the multicast middleware to tune in to a broadcast, associated with the service class and listed in the obtained multicast session list, during a time period associated with the broadcast;
one or more instructions to receive content associated with the broadcast using the multicast middleware; and one or more instructions to provide the received content to an application installed on the UE device.

20. The non-transitory computer-readable memory device of claim 19, wherein the one or more instructions to provide the received content include at least one of:
  one or more instructions to extract a compressed file from the received content;
  one or more instructions to correlate a thumbnail image in the received content with a video file in the received content; or
  one or more instructions to parse metadata associated with the received content into a file format associated with the application.

\* \* \* \* \*